United States Patent
Walker

(10) Patent No.: US 6,528,741 B2
(45) Date of Patent: Mar. 4, 2003

(54) TEXT ENTRY ON PORTABLE DEVICE

(75) Inventor: David P. Walker, Redhill (GB)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/920,040

(22) Filed: Aug. 1, 2001

(65) Prior Publication Data

US 2002/0014395 A1 Feb. 7, 2002

(30) Foreign Application Priority Data

Aug. 2, 2000 (GB) .............................................. 0018812

(51) Int. Cl.[7] .......................... H01H 13/70; G06F 3/023
(52) U.S. Cl. ..................... 200/5 R; 235/145 R; 341/22; 345/168; 400/489; 455/90
(58) Field of Search ................................. 200/5 R, 5 A, 200/6 A, 512–517; 235/145 R; 341/22; 345/168, 169; 400/485, 486, 488, 489; 379/428.01–433.13; 455/90

(56) References Cited

U.S. PATENT DOCUMENTS

| | | | | |
|---|---|---|---|---|
| 4,246,452 A | * | 1/1981 | Chandler | .................... 200/5 A |
| 4,469,330 A | * | 9/1984 | Asher | .................... 200/6 A X |
| 4,992,631 A | * | 2/1991 | Gee | ............................ 200/5 A |
| 5,087,910 A | | 2/1992 | Guyot-Sionnest | ........... 345/169 |
| 5,367,298 A | | 11/1994 | Axthelm | ....................... 341/22 |
| 5,883,690 A | * | 3/1999 | Meyers et al. | .............. 345/161 |
| 6,060,675 A | * | 5/2000 | Borg et al. | ............... 200/302.1 |
| 6,128,475 A | * | 10/2000 | Wicks et al. | ................... 455/90 |

FOREIGN PATENT DOCUMENTS

| | | | | |
|---|---|---|---|---|
| EP | 0840934 B1 | 5/1988 | .......... | H01H/13/70 |
| WO | WO0041061 | 7/2000 | .......... | G06F/3/023 |

* cited by examiner

Primary Examiner—J. R. Scott
(74) Attorney, Agent, or Firm—Jack D. Slobod

(57) ABSTRACT

A portable electronic device has a keypad for entering alphanumeric characters including a plurality of single contact keys and a multi-way shift key. A character is entered by actuating a single contact key (2) alone or in combination with the multi-way shift key (3). The multi-way shift key (3) may be a four-way rocker switch, with each single contact key having five character labels, four of which are arranged to indicate the direction in which the rocker switch should be actuated to enter the corresponding character.

4 Claims, 1 Drawing Sheet

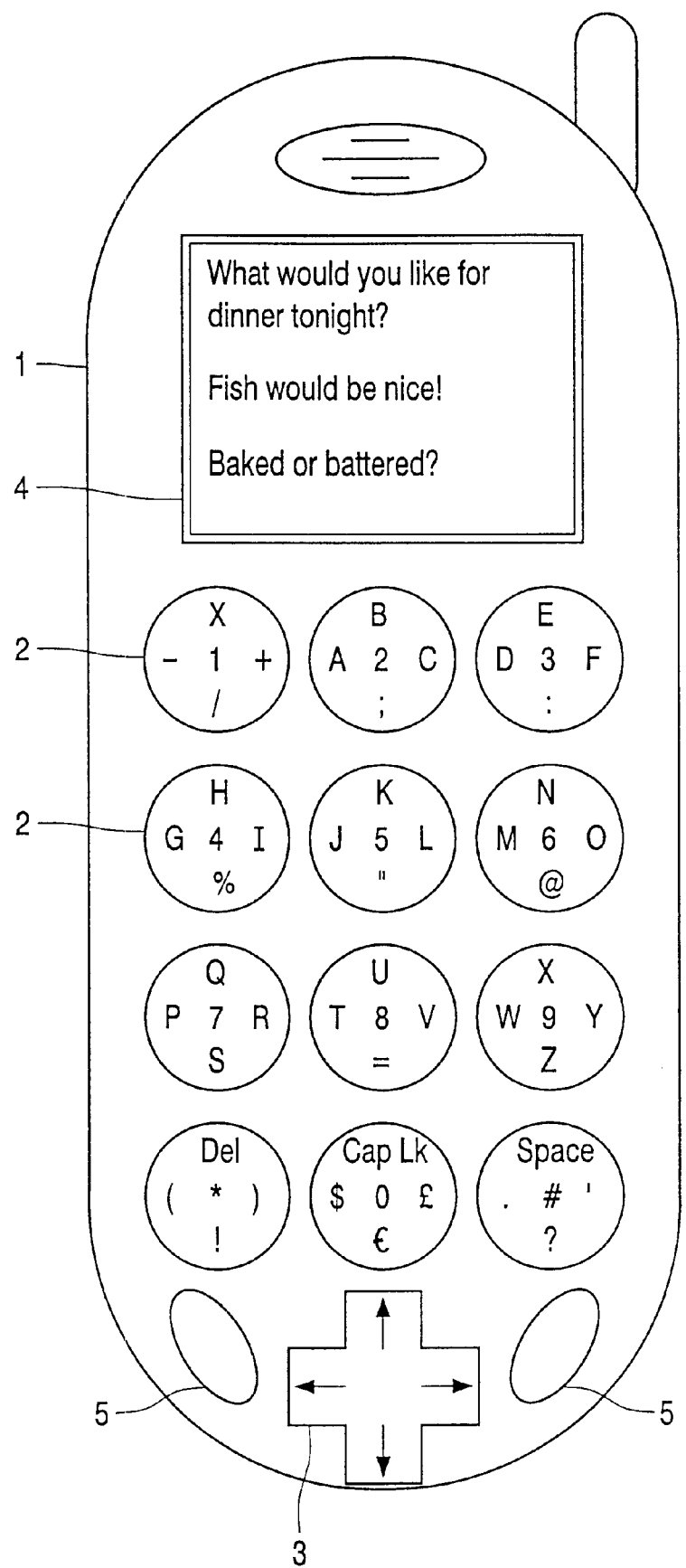

TEXT ENTRY ON PORTABLE DEVICE

The invention relates to a portable electronic device having means for entering characters and has particular, but not exclusive, application to portable radio devices such as mobile telephones, data terminals and pagers, and to hand held computers.

Portable electronic devices such as mobile telephones are being designed increasingly small. In parallel, there is an increasing requirement for entering characters such as alphanumeric text into such devices, for example for email communication while on the move. As a result there is a need for a small-sized man-machine interface that is easy to operate and can handle typically 40 or more characters.

One known way of achieving miniaturisation is to use small keys, which, for example, may be arranged in the standard QUERTY keyboard configuration. However, as portable electronic devices are made smaller, such a miniaturised keyboard configuration becomes increasingly difficult to operate.

Another known way of achieving small size is to reduce the number of keys by using multi-character keys in which repeated presses of a key, or continuous pressing of a key for different durations, results in different characters being entered.

Yet another known method is to use cursor control keys and an 'enter' key to select characters from a displayed alphabet.

The latter two methods can be slow and prone to error.

A further method disclosed in EP 0840934 B uses a single press of a multi-character key to enter each character, in which the point of pressure determines which character is entered. However, entering characters quickly and accurately using a plurality of such keys requires skill and practice.

An object of the invention is to provide improvements in entering characters into portable electronic devices.

According to the invention there is provided a portable electronic device having character selecting means for selecting characters for entry into the device, the character selecting means comprising a first key and a plurality of second keys, the first key having N switch contracts, where N>2, and each of the plurality of second keys having a single switch contact, wherein one of N characters may be selected by engaging in combination one of the N switch contacts of the first key and the single switch contact of one of the plurality of second keys.

In one embodiment of the invention the first key has four switch contacts, for example implemented in a four-way rocker switch, in which the four contacts are deployed radially about the centre of the switch.

The invention will now be described, by way of example with reference to the accompanying drawing, FIG. 1, which illustrates a mobile telephone embodying the invention.

Referring to FIG. 1 there is a mobile telephone 1 comprising a display 4 and a key pad. The keypad comprises a first key 3 which has two or more switch contacts, for example four switch contacts as shown, each of which may be engaged by touching or depressing a different area of the key. In FIG. 1 these four different areas of the first key are labelled with arrows pointing towards the top, bottom, left and right of the mobile telephone. The keypad also comprises a plurality of second keys 2 each of which has a single switch contact. The use of the first and second keys for selecting characters, including called telephone numbers, for entry into the mobile telephone is described below. The keypad further comprises additional keys 5 which may be used for performing control functions such as "on-hook", "off-hook", initiating transmission of messages and viewing received messages. The additional keys 5 may also be used in conjunction with the first key 3 and the second keys 2 to implement control functions, however methods of performing control functions are not described in this specification as they are not essential to the understanding of the present invention. Furthermore, the display 4 may include icons to assist the user in the execution of control functions, but these icons are not illustrated in FIG. 1.

In use, the second keys 2 may each be actuated alone to select a "primary" character for entry into the mobile telephone. For example, it may be convenient to enter the digits 0 . . . 9, * and # in this way for dialling a called telephone number and for entering these digits and symbols into a message. Additional "secondary" characters, for example alphabetical characters, punctuation and symbols, may be selected for entry by engaging in combination one of the four switch contacts of the first key 3 and the single switch contact of one of the plurality of second keys 2.

In FIG. 1, each of the plurality of second keys 2 is labelled with the primary character that may be selected by actuating that key alone, and the up to four secondary characters that may be selected when the switch contact of that key is engaged in combination with one of the four switch contacts of the first key 3. Conveniently, the positions of these secondary character labels for each of the plurality of second keys 2 correspond to the directions of the labelling arrows of the first key 3, the positions thereby indicating which character is selected when the corresponding area of the first key 3 is touched or depressed.

One way of operating a portable electronic device in accordance with the present invention is as follows. The user holds the mobile telephone in one hand and gently rests the thumb of that hand on the first key 3, or poises that thumb over the first key 3, and operates the plurality of second keys 2 using one or more fingers of the other hand. Each primary character is selected by actuating one of the second keys 2 alone. Each secondary character is selected by engaging in combination one switch contact of the first key 3 and the single switch contact of one of the plurality of second keys 2. The initial engagement of these two contacts need not occur at precisely the same time; it is the combination of engaged contacts that determines which character is selected, although whichever of the two contacts is engaged first must be maintained until the other contact has also been engaged.

As each secondary character is selected it is displayed to provide confirmation of selection to the user, and the user may accept the selection by de-actuating the currently actuated one of the plurality of second keys 2 before de-actuating the first key 3. The selection may be cancelled prior to acceptance by de-actuating the first key 3 before de-actuating the currently actuated one of the plurality of second keys 2.

In this way the dexterity required to operate a multi-switch-contact key may be confined to a single key, which may be operated by a dedicated finger or thumb without requiring any mobility of this finger or thumb between keys. The finger or fingers of the other hand may be mobile between each of the plurality of second keys 2 and require only sufficient dexterity to operate a single-switch-contact key.

According to the implementation described above, a key pad comprising one first key 3 having N switch contacts, and n second keys 2 each having a single switch contact, may be used to enter up to (N+1)×n different characters.

The method of entering characters described above may be used, for example, for composing a message for transmission or for entering data into a telephone directory facility. If a message is being composed for transmission, the message is entered, and edited if necessary, and then transmission may be initiated by means of, for example, one of the additional keys 5.

Optionally, each character may be selected by a combination of keys, without provision for selecting primary characters by means of a single key.

Optionally, the first key 3 may be located on a different surface of the portable electronic device than the plurality of second keys 2. For example, the first key 3 may be located on the side of a mobile telephone to facilitate operation by the user's thumb.

Optionally, the key labels may be located away from the surface of the keys contacted by the user.

In the present specification and claims the word "a" or "an" preceding an element does not exclude the presence of a plurality of such elements. Furthermore, the word "comprising" does not exclude the presence of other elements or steps than those listed.

From reading the present disclosure, other modifications will be apparent to persons skilled in the art. Such modifications may involve other features which are already known in the art of character entry on portable electronic devices and which may be used instead of or in addition to features already described herein.

What is claimed is:

1. A character selecting system for selecting characters for entry into a portable electronic device, said character selecting system comprising:

a multi-contact key operable to activate one of N number of selection switch contacts, N being equal to or greater than 2; and a single contact key operable to activate a character switch contact, wherein said single contact key is associated with n number of characters, n being equal to or greater than 1, wherein each character of the n number of characters corresponds to one of the N number of selection switch contacts, and wherein a first character of the n number of characters is entered into the portable electronic device in response to concurrent activations of said character switch contact and a first selection switch contact of the N number of selection switch contacts, said first selection switch contact corresponding to the first character.

2. The character selecting system of claim 1, wherein a confirmation of an entering of the first character into the portable electronic device is achieved by a deactivation of said character switch contact prior to a deactivation of said first selection switch.

3. The character selecting system of claim 1, wherein a cancellation of an entering of the first character into the portable electronic device is achieved by a deactivation of said first selection switch prior to a deactivation of said character switch contact.

4. The character selecting system of claim 1, wherein a second character excluded from the n number of characters and associated with said single contact key is entered into the portable electronic device in response to a concurrent activation of said character switch contact and deactivation of all of the N number of selection switch contacts.

* * * * *